United States Patent [19]

Barratt et al.

[11] 4,416,325
[45] Nov. 22, 1983

[54] HEAT EXCHANGER

[75] Inventors: Robert O. Barratt, Cedar Knolls; Howard N. Franklin, Parsippany, both of N.J.

[73] Assignee: Foster Wheeler Energy Corporation, Livingston, N.J.

[21] Appl. No.: 135,419

[22] Filed: Mar. 31, 1980

[51] Int. Cl.³ ............... F28D 15/00; F23L 15/04
[52] U.S. Cl. ............................. 165/47; 110/254; 122/DIG. 2; 165/134 DP; 165/145; 165/DIG. 12; 29/157.3 H
[58] Field of Search ............. 165/145, 104.21, 47, 165/DIG. 12, 134 DP; 122/DIG. 2; 110/254

[56] References Cited
U.S. PATENT DOCUMENTS

| | | | |
|---|---|---|---|
| 1,725,906 | 8/1921 | Gay | 165/104.21 X |
| 1,914,604 | 6/1933 | Keenan, Jr. et al. | 165/134 DP X |
| 2,153,942 | 4/1939 | Spalding, Jr. | |
| 2,854,220 | 9/1958 | Vaughan | 165/134 DP X |
| 2,970,811 | 2/1961 | Ruch et al. | 165/134 DP X |
| 4,029,142 | 6/1977 | Van Beubering | 165/145 X |

Primary Examiner—Albert W. Davis, Jr.
Attorney, Agent, or Firm—Marvin A. Naigur; John E. Wilson; Warren B. Kice

[57] ABSTRACT

A combustion air preheater for heating combustion air with heat energy provided from flue gas includes both a heat pipe type heat exchanger for effecting low temperature heat transfer between the flue gas and the combustion air and a tube-and-shell type heat exchanger for effecting higher temperature heat transfer. The preheater includes a first heat exchanger, having first and second heat transfer compartments with a plurality of heat pipes extending therebetween and a second, connected heat exchanger which includes a plurality of heat tubes supported by tube sheets within a shell. Ducting is provided to direct flue gas over the tubes of the second heat exchanger and then through one of the compartments of the first heat exchanger and additional ducting is provided to direct combustion air through the other compartment of the first heat exchanger and through the tubes of the second heat exchanger. Heat energy is transferred through the walls of the tubes in the second heat exchanger to the combustion air in a first, higher temperature range with additional heat energy transferred to the combustion air in the first heat exchanger in a second, lower temperature range through the heat pipes. The preheater advantageously uses the heat pipes in the lower temperature range and the tube-and-shell heat exchanger in the higher temperature range to effect high overall preheater thermal efficiency over a wide temperature range with minimal corrosive attack on the heat exchange surfaces.

7 Claims, 6 Drawing Figures

HEAT EXCHANGER

BACKGROUND OF THE INVENTION

1. Field of the Invention

The present invention relates to heat exchangers and, more particularly, to heat exchangers designed to preheat combustion air for a combustion furnace, using heat energy removed from the flue gas.

2. Prior Art

The thermal efficiency of combustion furnaces and combustion systems has typically been increased by recovering heat energy from the resulting flue gas and using this energy to preheat the combustion air. This preheating has been effected in a number of ways, including the use of recuperator type heat exchangers, by which thermal energy is transferred to the combustion air. These heat exchanger structures have ranged from comparatively simple devices, in which the flue gas and combustion air are carried in adjacent ducts that are in heat exchange relationship with one another, to far more sophisticated devices that include tube-and-shell heat exchangers, thermal siphons, and heat pipe type heat exchangers.

Recent increases in the cost of hydrocarbon fuels have necessitated improvement in the overall thermal efficiency of combustion furnaces. The search for these higher efficiencies has been complicated further by two factors: (1) the economic necessity of using fuels having a higher than preferred sulphur content and (2) the need for fuels requiring greater than usual quantities of combustion air to realize the full heat value of the fuel. An example of one such high sulphur fuel, requiring large amounts of combustion air, is the coal typically available in the western United States.

Prior tube-and-shell type heat exchangers, used as combustion air preheaters, have generally demonstrated adequate performance. However, these types of heat exchangers require large surface areas to effect efficient transfer. This large surface area requirement results in a cleaning and maintenance problem associated with the deposition of soot and other particles from the flue gas flows. In addition, these large surface heat exchangers are subject to corrosive attack when used in the lower temperature ranges because of acid vapor condensation. In a like manner, heat-pipe heat exchangers have also demonstrated good operating performance but their upper temperature limit of operation is generally considered low when compared to the high temperature of flue gases produced in the combustion process. The operation of heat pipes above their rated temperature limit results in performance degradation of the heat pipe and, occassionally, tube burn-out. In addition, since heat pipes operate in the lower temperature ranges of the flue gas, they are also subject to corrosive attack by acidic components of the flue gas. While high-temperature heat pipes exist and can be fabricated to withstand corrosive attack, these types of heat pipes generally require costly materials and heat transfer mediums, which are too expensive for conventional combustion air preheater applications.

SUMMARY OF THE INVENTION

In view of the above, it is an overall object of the present invention, among others, to provide a combustion air preheater that efficiently operates over a wide temperature range to transfer heat energy from flue gas to combustion air.

Another object of the present invention is to provide a combustion air preheater that provides effective heat transfer in a high temperature range, using a first-type of heat exchanger, and effective heat transfer in the low temperature range, using a second type of heat exchanger to provide high overall efficiency over a wide temperature range.

It is still another object of the present invention to provide a combustion air preheater in which the likelihood of acid attack is reduced by using a first large-surface heat exchanger in a higher temperature range and a second heat exchanger in a lower temperature range with the second heat exchanger confined to operation above the acid dew point to minimize acid vapor condensation.

In accordance with these objects and others, the present invention provides a combustion air preheater for heating combustion air using heat energy transferred from the flue gas to the combustion air. The preheater includes a heat exchanger defined by a plurality of heat pipes extending between first and second heat transfer compartments for effecting heat transfer therebetween and another heat exchanger defined by a plurality of tubes supported in a shell by tube sheets for transferring heat energy from one side of the tubes to the other. Ducting is provided for conveying flue gas into the second-mentioned heat exchanger, over the exterior surfaces of the tubes, and then to one of the heat transfer compartments of the first-mentioned heat exchanger. Additional ducting is provided for conveying combustion air into the other heat transfer compartments and then through the tubes of the second-mentioned heat exchanger so that heat energy from the flue gas, in a higher temperature range, is transferred from the exterior side of the tubes to the combustion air flowing through the interior of the tubes, and additional heat energy from the flue gas, in a lower temperature range, is transferred to the combustion air from the first heat transfer compartment to the second heat transfer compartment. By structuring a preheater in this manner, heat energy in a higher temperature range is efficiently transferred through the tube-and-shell heat exchanger and additional heat energy, in a lower temperature range, is efficiently transferred to the combustion air to obtain the benefits of both types of heat exchangers.

Other features of the invention include providing the heat pipes of the first-mentioned heat exchanger with extended heat transfer surfaces with the spacing of these surfaces arranged to maintain the temperature of the heat pipe mounting plate above the local acid dew point thus preventing or at least minimizing corrosive attack thereto, and fabricating the heat pipe in two parts to permit convenient assembly within the first-mentioned heat exchanger, reducing fabrication costs.

DESCRIPTION OF THE FIGURES

The above descripton, as well as the objects, features, and advantages of the present invention, will be more fully appreciated by reference to the following detailed description of a presently preferred but nonetheless illustrative embodiment in accordance with the present invention when taken in conjunction with the accompanying drawings wherein.

DETAILED DESCRIPTION OF THE PREFERRED EMBODIMENT

Figure 1:
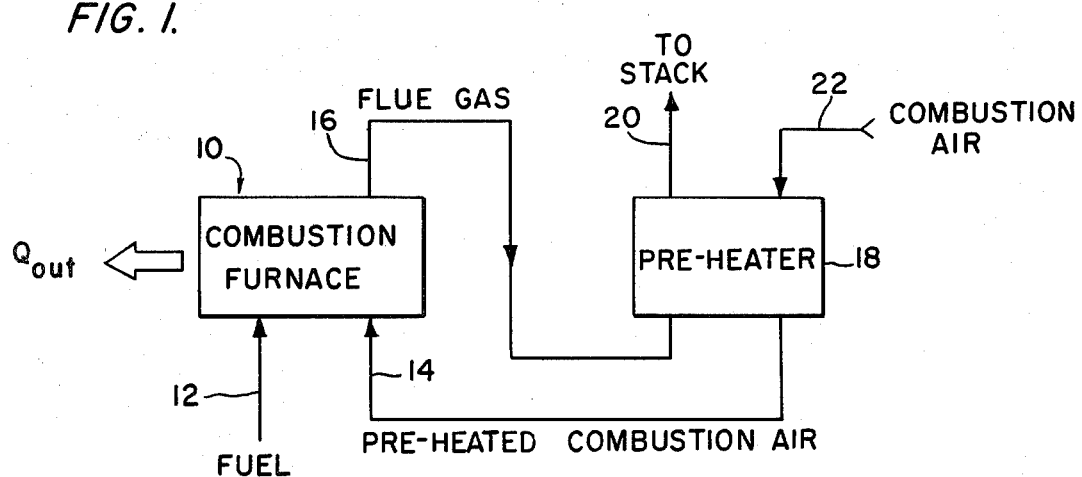
FIG. 1 is an overall system view, in diagrammatic form, of a combustion furnace incorporating a combus

A combustion furnace system incorporating a combustion air preheater in accordance with the present invention is shown in diagrammatic form in FIG. 1 and includes a combustion furnace 10 that receives a supply of hydrocarbon fuel such as petroleum or coal along an inlet line 12 and a source of combustion air through another line 14. The combustion furnace 10 produces heat energy as indicated for subsequent use in the thermal cycle (not shown) and also produces a products-of-combustion flue gas directed through outlet line 16. As is conventional in the art, the flue gas is directed through the outlet line 16 to a combustion air preheater 18 and is passed therethrough to a preheater outlet 20 and is subsequently discharged through the system stack (not shown). Incoming combustion air is provided to the preheater 18 through an inlet line 22 and is passed through the preheater 18 in a heat exchange relationship with the hot flue gases to preheat the combustion air. The so-preheated combustion air is then introduced into the combustion furnace 10 through the aforementioned combustion air inlet line 14.

Figure 2:
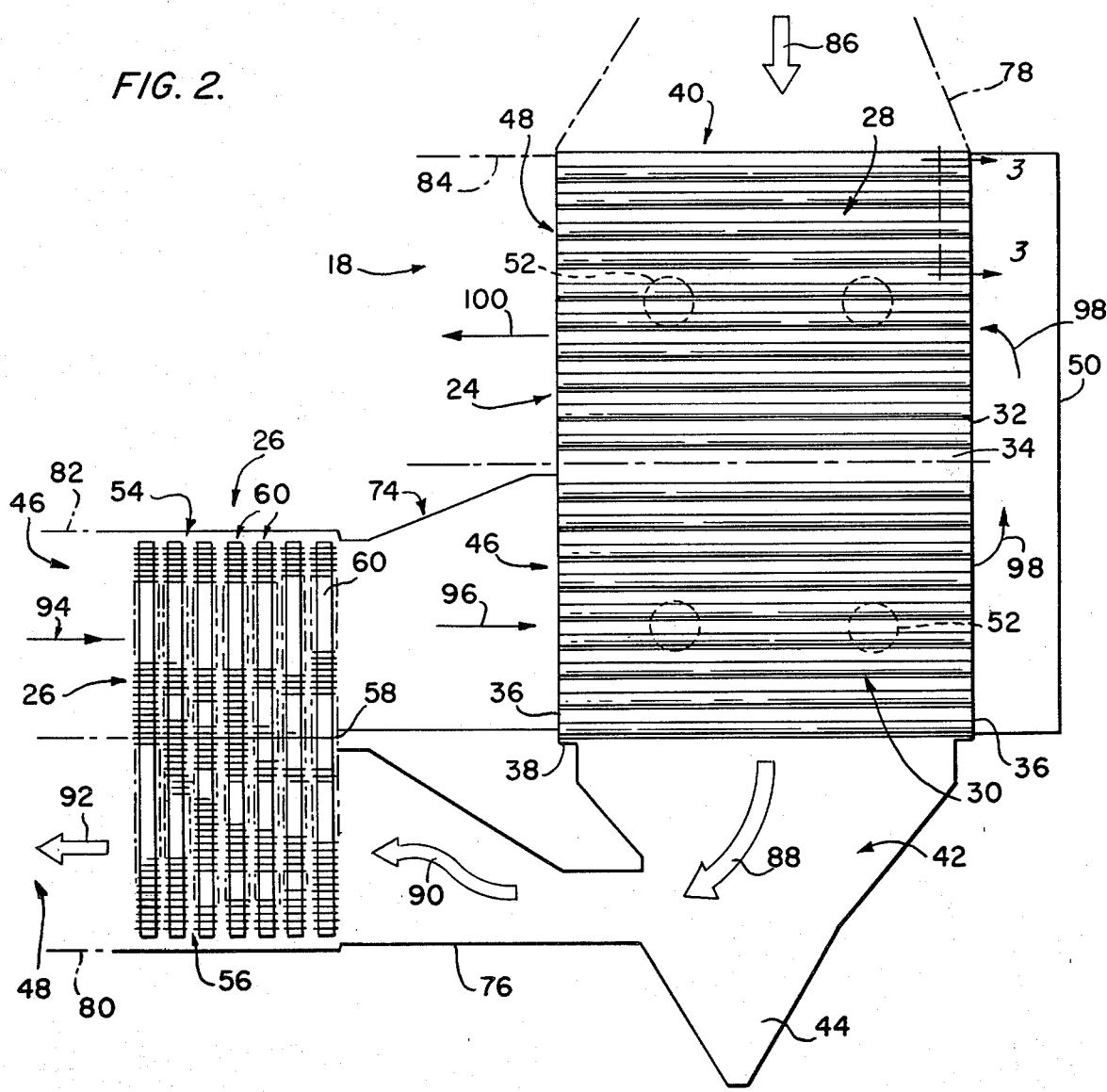
- FIG. 2 is a side elevational view, in cross-sectional schematic form, of a combustion air preheater in accordance with the present invention.

A combustion air preheater 18 in accordance with the present invention is shown in FIG. 2 and is designed to efficiently transfer heat energy to the incoming combustion air from the outgoing flue gas in low and high temperature ranges to provide high overall operating efficiency. As shown therein, the preheater 18 includes a primary heat exchanger, generally designated by the reference character 24, and a secondary heat pipe-type heat exchanger, generally designated by the reference character 26.

Figure 3:
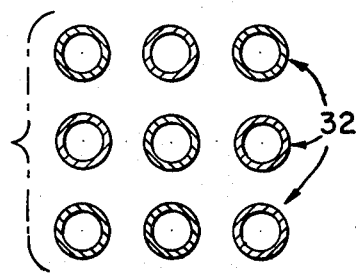
FIG. 3 is a cross-sectional view taken along line 3—3 of FIG. 2, showing an exemplary arrangement of heat transfer tubes.

The primary heat exchanger 24 is a two stage tube-and-shell type exchanger in that it includes first and second bundles 28 and 30 of generally horizontally disposed heat exchanger tubes 32 with the first bundle 28 disposed above the second bundle 30 and with the dividing line between the two bundles generally indicated at 34. The heat transfer tubes 32 may be distributed in their respective bundles as exemplified in the cross-sectional view of FIG. 3. The upper and lower tube bundles 28 and 30 each include tube sheets 36 at their opposite ends for supporting the tubes in the preferred distribution with the bundles 28 and 30 and their associated tube sheets 36, enclosed by an exterior shell, generally indicated at 38 (only partially shown in schematic form in FIG. 2) with the shell 38 enclosing the tube bundles as is conventional in the art. The shell 38 defines an upwardly facing flue gas inlet 40, a downwardly facing flue gas discharge outlet 42 that includes a soot and particulate matter trap 44, a combustion air inlet 46, and a combustion air outlet 48. A header or plenum chamber 50 is provided on the right side of the primary heat exchanger 24 to provide gas phase communication between the right ends of the upper and lower tube bundles 28 and 30. Soot blowers or other devices designed to prevent or inhibit the accumulation of soot or other particulate matter entrained in the flue gas on the exterior surface of the tubes 32 may preferably be located as indicated by the dotted-line circles 52.

Figure 4:
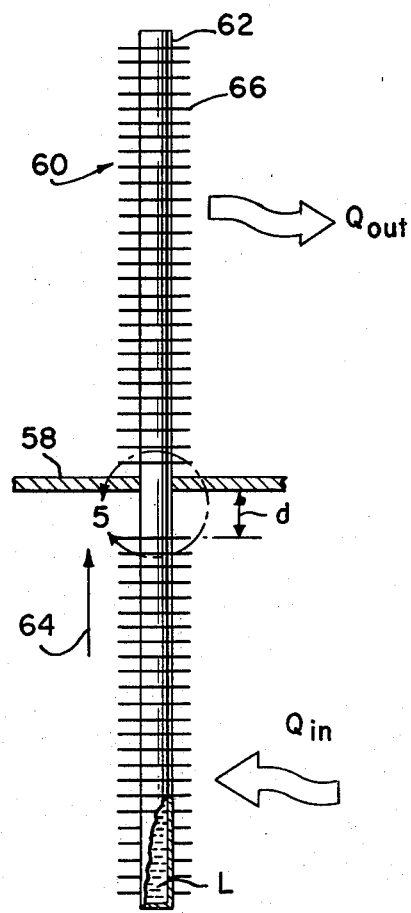
FIG. 4 is a side elevational view, in partial cross section, of an exemplary heat pipe.

The secondary heat exchanger 26 is defined by upper and lower heat transfer compartments, 54 and 56, separated by an intermediate partition 58. A plurality of generally vertically aligned heat pipes 60 pass through appropriately sized openings in the partition 58 and extend into the lower and upper compartments, 56 and 54, with the heat pipes 60 being attached to the intermediate partition 58 as described in more detail below. The heat pipes 60 are arranged in either parallel or staggered row formation, as desired, and are of conventional design, in that they are fabricated, as shown in FIG. 4, from straight, hollow tubes 62 which are sealed at both ends. Each tube 62 contains a selected quantity of a heat transfer liquid (e.g., ammonia) at a selected vapor pressure. The liquid L collects in the lower portion of each tube 62, termed the evaporator section, and is adapted to vaporize in response to heat energy ($Q_{in}$) introduced into the evaporator section. The so-formed vapor rises upwardly in the tube 62, as indicated by the arrow 64 in FIG. 4, and condenses in the upper, condenser portion of each tube, relinquishing the heat energy ($Q_{out}$) with the condensate falling under the influence of gravity to the evaporator section. The heat pipes 60 may be provided with various types of internal wicking materials (not shown) to assist in returning the condensate to the evaporator section when the heat pipes are used in a non-vertical alignment. As used herein, the term "heat pipe" encompasses heat pipes with wicking material as well as without wicking material, the latter devices also referred to in the art as thermal siphons. Each pipe 60 is provided with a plurality of disc-like annular fins 66 that extend outwardly from the tube surface and are generally equally axially spaced to provide an extended heat transfer surface. Although annular fins are shown in the figures, the fins may take the form of any one of a number of surface configurations including spines, longitudinal fins, and spiral fins with certain of the fins or extended heat transfer surface configured as described in more detail below.

Figure 5:
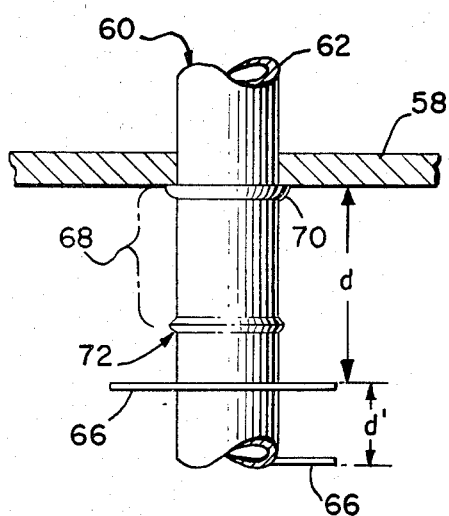
FIG. 5 is an enlarged, detailed view of a portion of the heat pipe illustrated in FIG. 4, showing details of the fabrication thereof.

As shown in the detailed views of FIGS. 4 and 5, the fin 66 closest to the partition 58 on the evaporator side of the heat pipes (that is, the lower heat transfer compartment 56) is spaced at a distance d from the partition 58 which distance is greater than the inter-fin spacing d'. The spacing, as explained below, minimizes the formation of corrosive materials on the partition 58 during operation of the preheater 18.

The heat pipes 60 of the secondary heat exchanger 26 can be facricated as shown in the detailed view of FIG. 5. The heat pipe 60 can be initially manufactured in two separate parts, an upper part and a lower part, with one of the parts, e.g., the upper part, designed to be passed through an appropriately sized clearance opening in the partition 58 so that a stub portion 68 extends below the lower surface of the intermediate partition. Thereafter, the upper portion can be secured in place by an appropriate fillet weld, as indicated at 70, and the lower part of the two-part heat pipe 60 can be positioned and butt-welded to the upper part as indicated at 72 to complete the heat pipe fabrication. As can be appreciated, the above-mentioned fabrication technique can be conducted with the stub portion of a lower part extending above the surface of the partition 58 with the fillet and butt-welding taking place above the surface of the partition 58.

The primary and secondary heat exchangers, 24 and 26, are connected together by ducting as shown in FIG. 2. A duct 74 extends between the upper compartment 54 of the secondary heat exchanger 26 to the inlet 46 of the lower tube bundle 30, and another duct 76 extends between the lower compartment 56 of the secondary heat exchanger 26 and the flue gas outlet 42 of the primary heat exchanger 24. Other ducting is provided to supply and remove flue gas and combustion air to and from the heat exchanger preheater 18. These additional ducts (shown in dotted-line illustration) include a duct 78 for directing flue gas into the preheater 18, a duct 80 for directing flue gas away from the preheater to the system stack, a duct 82 for directing combustion air into the preheater, and another duct 84 for directing preheated combustion air away from the preheater.

In operation, high-temperature flue gases are directed through the duct 78 to the flue gas inlet 40 of the primary heat exchanger 24 as indicated by the arrow 86 in FIG. 2 downwardly over the upper and then the lower tube bundles, 28 and 30, with a portion of the thermal energy in the flue gas being passed through the tubes 32. Thereafter, the flue gas exits the primary heat exchanger 24 through the flue gas outlet 42 and passes through the duct 76 as indicated generally by the arrows 88 and 90. During the passage of the flue gas through the primary heat exchanger 24, soot, including soot that is dislodged from the tubes 32 by the soot blowers shown at the locations 52 and other particulate material collect in the trap 44.

The heated flue gas then passes through the lower compartment 56 of the secondary heat exchanger 26 with additional heat energy being removed from the flue gas by the evaporator sections of the heat pipes 60 and transferred to the upper compartment 54. The flue gas, at a substantially lower temperature than its inlet temperature, is then passed through the outlet duct 80, as indicated generally by the arrow 92 to the system stack (not shown). Incoming combustion air is directed through the duct 82 in the general direction of the arrow 94 through the upper compartment 54 of the secondary heat exchanger 26 and past the condenser sections of the heat pipes 60. The incoming combustion air is heated with heat energy supplied from the flue gas passing through the lower compartment 56. Thereafter the partially heated combustion air is passed through the duct 74 in the general direction of the arrow 96 through the interior of the tubes 32 of the lower tube bundle 30 where the combustion air is again heated with thermal energy provided from the flue gas flowing on the exterior side of the tubes 32. The combustion air exits the tubes 32 of the lower bundle 30 and flows in the general direction of the arrows 98 to enter the tubes 32 of the upper bundle 28 and pass therethrough having its temperature increased by receiving additional heat energy from the flue gas flowing on the exterior side of the tubes 32 of the upper bundle 28. The preheated combustion air then exits the tubes 32 of the upper bundle 28 and is removed from the preheater 18 through a duct 84 as indicated by the arrow 100.

Figure 6:
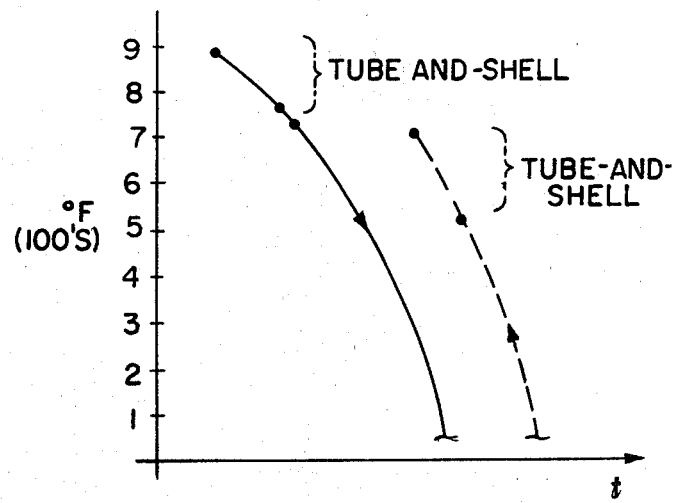
FIG. 6 is a graphical representation of the temperature (ordinate) of the flue gas (solid line) and combustion air (dashed line) with respect to transit time (abscissa) through the preheater with the two curves displaced from one another for reasons of clarity.

As graphically illustrated in the graph of FIG. 6, the temperature of the flue gas (solid line) as it enters the preheater 18 is approximately 900° F. (460° C.) and is lowered to approximately 750° F. (400° C.) as it passes over the tubes 32 of the upper and lower tube bundles, 28 and 30, by virtue of a portion of the heat energy thereof being transferred through the walls of the tubes to the combustion air flowing through the interior of the tubes. The flue gas then passes through the duct 76 and enters the lower compartment 56 of the secondary heat exchanger 26 at approximately 700° F. (340° C.) and is cooled further to its final exit temperature of 200° F. (95° C.) by the transfer of additional heat energy from the flue gas to the evaporator section of the various heat pipes 60.

On the other hand, combustion air (dotted line) enters the upper compartment 54 of the secondary heat exchanger 26 at approximately 100° F. (40° C.) and is heated to a temperature of approximately 500° F. (260° C.) with the heat supplied by the flue gas flowing in the lower compartment 56 of the secondary heat exchanger 26. The partially preheated combustion air then enters and flows through the tubes 32 of the lower bundle 30 and then blows through the tubes 32 of the upper bundle 28 where its temperature is increased to approximately 700° F. (340° C.).

As can be appreciated by consideration of the flue gas and combustion air flowing in relationship to the graphical example of FIG. 6, it can be seen that a substantial portion of the heat energy in the flue gas is transferred to the incoming combustion air to effect preheating and an overall increase to system efficiency. By initially passing the high temperature flue gas through a tube-and-shell heat exchanger, efficient heat transfer can take place through the tubes without the need for extraordinarily large surface areas. By then passing the somewhat cooler flue gas through a heat pipe heat exchanger, efficient heat transfer of the remaining heat in the flue gas can take place at a lower temperature without danger of operating the heat pipes at a temperature above their upper limits.

Accordingly, a smaller tube-and-shell heat exchanger may be used than otherwise would be the case to effect a size reduction in the overall preheater and to also limit problems associated with acid dew formation. In addition, the fin spacing arrangement described above in connection with FIG. 5 maintains the partition 58 in a warmer state thus minimizing acid dew formation. Furthermore, the fabrication technique for the heat pipes described reduces assembly costs for the preheater as a whole.

As will be apparent to those skilled in the art, various changes and modifications may be made to the combustion air preheater of the present invention without departing from the spirit and scope of the present invention, as defined in the depending claims and their legal equivalent.

What is claimed is:

1. A combustion air preheater for heaing combustion air with heat energy provided from hot flue gas, said preheater comprising, in combination:

a first heat exchanger having a partition separating the first heat exchanger into lower and upper heat transfer compartments, a plurality of heat pipes extending from within said lower heat transfer compartment to within said upper heat transfer compartment for effecting heat transfer therebetween, each of said heat pipes comprising a closed cylindrical wall having an upper portion and a lower portion and a plurality of fins extending radially outward from said wall, said wall extending through a hole in said partition of substantially the same diameter as said wall, said upper portion being welded to said partition at the lower surface thereof, said upper and lower portion being welded together at a location below said partition, with at least the distance between the welded joint and the partition being devoid of any fin the resulting area devoid of fins being sufficient so that the removal of heat is limited to the extent that the partition is heated to a temperature high enough to avert excessive precipitation of moisture and the concomitant corrision at the upper surface thereof;

a second heat exchanger defined by a plurality of tubes supported in a shell by tube sheets for transferring heat energy from one side of said tubes to the other side thereof;

first duct means for conveying the flue gas into said second heat exchanger and over the exterior surfaces of said tubes and to such lower compartment in said first heat exchanger; and second duct means for conveying the combustion air into and through the upper compartment of said first heat exchanger; and through said tubes of said second heat exchanger;

whereby the hot flue gas is passed over the exterior surface of said tubes and then through said lower compartment and the combustion air is passed through the upper compartment and then through the interior of said tubes so that heat energy from the flue gas in a first higher temperature range is transferred through said tubes in said second heat exchanger to the combustion air and additional heat energy from said flue gas in a lower temperature range is transferred to said combustion air from the lower compartment to the upper compartment through said heat pipes.

2. The heat exchanger apparatus claimed in claim 1 wherein said heat pipes are disposed in a generally vertical direction and said tubes are disposed in a generally horizontal direction.

3. The heat exchanger apparatus claimed in claim 1 wherein said lower and upper heat transfer compartments of said first heat transfer means are positioned in a superposed relationship with one another with heat pipes extending vertically therebetween.

4. The heat exchanger apparatus claimed in claim 1 wherein the flow of the flue gas and the combustion air in said first heat exchanger is substantially countercurrent.

5. The heat exchanger apparatus claimed in claim 4 wherein said fins are annular fins.

6. The heat exchanger apparatus claimed in claim 1 wherein said tubes are divided into at least two tube bundles, said combustion air flowing first through one bundle and then through the other bundle.

7. The preheater apparatus claimed in claim 6 wherein said first heat exchange means further comprises:
means for removing soot and/or other particulate matter from the exterior surface of said tubes and collection means for collecting the so-removed soot and/or particulate matter.

* * * * *